United States Patent [19]

Krishnaswamy et al.

[11] Patent Number: 5,974,421
[45] Date of Patent: Oct. 26, 1999

[54] CACHE-EFFICIENT OBJECT LOADER

[75] Inventors: Raja Krishnaswamy, Bellevue; Ketan Dalal, Seattle, both of Wash.

[73] Assignee: Microsoft Corporation, Redmond, Wash.

[21] Appl. No.: 08/772,467

[22] Filed: Dec. 23, 1996

[51] Int. Cl.⁶ .................................................. G06F 17/30
[52] U.S. Cl. .............................. 707/103; 707/2; 707/200
[58] Field of Search ............................... 707/1, 103, 104, 707/2, 200; 711/132

[56] References Cited

U.S. PATENT DOCUMENTS

| | | | |
|---|---|---|---|
| 5,440,732 | 8/1995 | Lomet et al. ................................. | 707/1 |
| 5,692,185 | 11/1997 | Nilsen et al. ........................... | 707/104 |
| 5,761,670 | 6/1998 | Joy .......................................... | 707/103 |
| 5,778,436 | 7/1998 | Kedem et al. ........................... | 711/132 |

OTHER PUBLICATIONS

Duff, Charles B., "Designing an Efficient Language," *Byte*, Aug. 1986, pp. 211–224.

*Inside Macintosh*, vol. II, "The Memory Manager," Aug. 1985, p. 7 and pp. 9–51.

Kaehler, Ted, "Virtual Memory for an Object–Oriented Language," *Byte*, Aug. 1981, pp. 378–387.

Zdonik, Stanley B. and Maier, David (editors), *Readings in Object Oriented Database Systems*, Morgan–Kaufmann, Palo Alto, CA, Jan. 1990, pp. vii–x and pp. 298–307.

Anderson and Shanley, *Pentium Processor System Architecture*, 2d ed., Addison–Wesley, Jan. 1995, pp. 35–60.

Knuth, Donald E., *The Art of Computer Programming*, vol. 3, Addison–Wesley, Apr. 1973, pp. 506–549.

Teuhola, Jakka, "Effective Clustering of Objects Stored by Linear Hashing, " *CIKM '95*, Baltimore, Maryland, Apr. 1995, pp. 274–280.

Suzuki, Shinji et al., *Dimensions and Mechanisms of Persistent Object Faulting*, Institute of Industrial Science, University of Tokyo, 7 pages. No date.

Kaiser, J., "Mutabor, A Coprocessor Supporting Memory Management in an Object–Oriented Archictecture," *IEEE Micro*, 8(5): 30–46, Jan. 1988.

Williams, John G., "Storage Utilization in a Memory Hierarchy When Storage Assignment Is Perfomed by a Hashing Algorithm," *Communications of the ACM*, 14(3): 172–175, Mar. 1971.

"Minimizing Locking to Access Global Shared Data," *IBM Technical Disclosure Bulletin*, 38(2): 619–622, Feb. 1995.

*Primary Examiner*—Wayne Amsbury
*Assistant Examiner*—Cheryl Lewis
*Attorney, Agent, or Firm*—Schwegman, Lundberg, Woessner & Kluth, P.A.

[57] ABSTRACT

An improved object loader is provided that is designed to take advantage of the caching architecture of many of today's processors to improve performance. Some of today's most advanced processors, like the PENTIUM processor, have a two-level caching scheme utilizing both a primary cache and a secondary cache, where data contained in the primary cache is accessible 50 to 150 times faster than data in main memory. The improved object loader uses a hash table and an object handle table to load objects, where each of these tables is designed and utilized in such a manner so as to take full advantage of the processor's caching architecture to increase system performance.

52 Claims, 11 Drawing Sheets

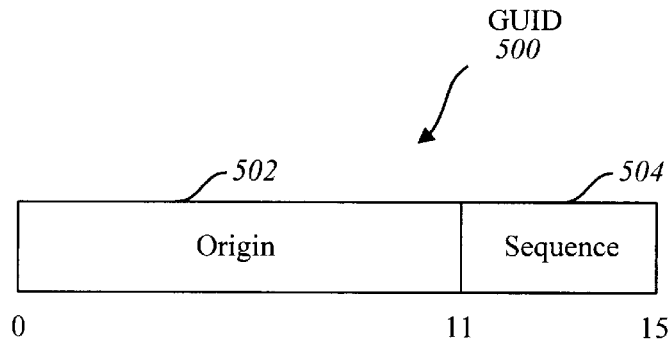
*Fig. 5A*
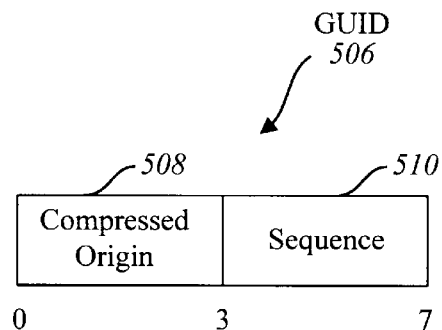
*Fig. 5B*
| Compressed Origin | GUID Origin |
|---|---|
| 1 | 865752 |
| 2 | 1357462 |
| 3 | 573499 |
*Fig. 5C*

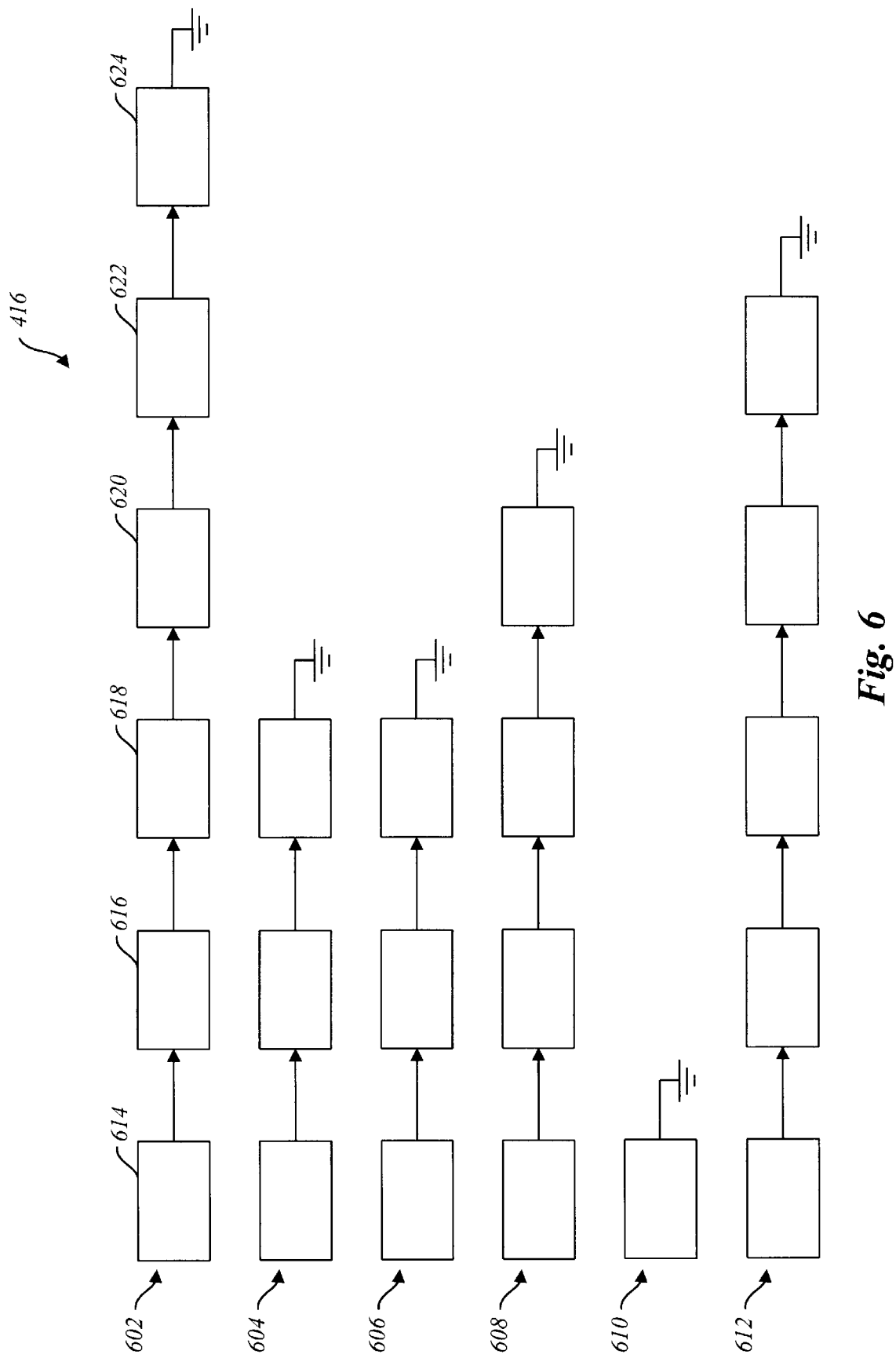

*Fig. 8*

CACHE-EFFICIENT OBJECT LOADER

TECHNICAL FIELD

The present invention relates generally to data processing systems and, more particularly, to a cache-efficient object loader.

BACKGROUND OF THE INVENTION

As processors have become faster, main memory access has become the bottleneck to overall increased system performance. Therefore, in order to improve performance, memory caching schemes have been adopted to lessen the effect of the main memory bottleneck. The PENTIUM processor employs one such memory caching scheme. In accordance with the PENTIUM processor's caching scheme, when the processor needs to read data from memory, the processor first checks the primary cache to locate the data. If the data is located in the primary cache, the data is returned to the processor. If the requested data is not located in the primary cache, then the secondary cache is checked, which has a slower access time than the primary cache, but is still much faster than main memory. If the data is located in the secondary cache, the data is returned to the processor and the line ("cache line") of the secondary cache that stored the data is copied into the primary cache. That is, rather than just copying the data that is being read to the primary cache, an entire 32-byte cache line is copied to the primary cache. The primary cache is 8 KB in size, so it can store 256 cache lines. The secondary cache is typically 64 KB to 512 KB, so it can store between 2,048 to 16,384 cache lines.

If after checking the secondary cache the data is still not located, main memory is accessed, which has a significantly slower access time than the secondary cache. When main memory is accessed, not only the requested data, but an entire memory line of 32 bytes is returned. Upon returning the 32 bytes, the processor receives the data it requested and the primary and secondary cache both receive the entire 32-byte memory line, also known as a cache line. The 32-byte memory line is stored in the primary cache in the hope that the next time the processor needs to read data from memory, the data will be found within this cache line, saving a main memory access which saves significant processing time. To put the costs in perspective, it takes 1 processor cycle to access the primary cache, 4–12 processor cycles to access the secondary cache, and 50 processor cycles to access main memory. Therefore, the primary cache could be searched perhaps 50 times in the time that it takes to access main memory once. The PENTIUM processor's caching mechanism is described in greater detail in Anderson and Shanley, *Pentium Processor System Architecture,* 2d ed., Addison-Wesley, 1995, pp. 35–60, which is hereby incorporated by reference.

Object loaders have been developed that load objects into memory in response to an application program's request to use the object. One example of an object is a portion of data, such as a range of spreadsheet cells from a spreadsheet program. In some conventional systems, when an application program wants to use an object, it has an identifier of the object, but it must obtain the memory address of the object before the object can be utilized. In this situation, an object loader is utilized to obtain the memory address. If, however, the object is not already loaded into memory, the object loader locates the object from a secondary storage device, stores the object into memory, and returns the memory address.

Some conventional object loaders use a conventional hashing mechanism to assist in performing their functionality. Conventional hashing mechanisms utilize a data structure known as a hash table to provide direct access to stored data. One example of a conventional hashing mechanism 100 is depicted in FIG. 1. The hashing mechanism 100 comprises a key 102, a hash function 104, a hash index 106, and a hash table 108. The hash table 108 contains a number of hash buckets 110–130, and each hash bucket contains data, such as a record, with one of the fields of the record acting as the key 102. In order to access the hash table 108, the key 102 is input into a hash function 104 which yields an index 106 (or hash address) that refers to a specific hash bucket (e.g., 114). Within the hash bucket 114 is the data that matches the key, unless the data has not yet been stored in the hash bucket. Hash tables are useful because they provide direct access to data by mapping a large range of key values into a smaller range of indexes. In this manner, for example, if a key of eight digits were utilized having a range of key values from 0 to 99,999,999 and if less than ten values are ever used, a hashing mechanism can be used to hash the key into an index of one digit to refer to a hash table containing ten buckets. Therefore, instead of using a hash table having one-hundred-million hash buckets where only a very limited number of the buckets are ever used, a hash table of only ten buckets can be used to more efficiently use system resources, but still provide direct access to the data.

The function "h" 104 maps each key value onto exactly one index, and therefore, whenever the same key value is used more than once, the same index 106 into the hash table 108 is generated. Sometimes, however, when attempting to store data in the hash table 108, more than one key value will hash to the same index 106. In this situation, a "collision" has occurred. When a collision occurs, the data must be stored in the hash bucket indicated by the index and therefore more than one record will be stored in this hash bucket. Hash bucket 118 depicts the state of a hash bucket after a collision has occurred and more than one record is stored in the hash bucket. In hash bucket 118, one record of data "data 3" is linked to a second record of data "data 4." As more collisions occur, the hash buckets become more populated and thus the benefits of a hash table start to diminish because each record within the hash bucket is no longer directly accessible. Instead, after hashing the key value into an index, the index refers to a hash bucket that contains a number of records linked together and the hash bucket must then be searched to determine the correct record, which is costly in terms of processing time. Therefore, conventional hashing systems are designed to avoid collisions.

The conventional object loaders utilize the conventional hashing mechanism 100 by using an object identifier as the key 102 and by storing both the memory addresses of the objects and the object identifiers as the data in the hash buckets 110–130 of the hash table 108. As such, upon receiving an object identifier of a given object from an application program, the conventional object loader retrieves the memory address of the object by applying the hash function 104 to the object identifier to create an index 106 which refers to a hash bucket of the hash table 108 and by retrieving the memory address for the object from the hash bucket. If the memory address for the object is not yet contained in the hash table, the object loader locates the object from a secondary storage device, stores the object into memory, stores the memory address into the hash table, and returns the memory address.

The processing of conventional object loaders can take a significant amount of processing time to locate objects and to load them into memory. This processing becomes even more burdensome on the system as the number of objects utilized within the system becomes extremely large. In addition, a significant amount of processing time and memory is used to locate an object even after loading it into memory. Thus, it is desirable to improve the performance of object loaders. However, conventional object loaders have not taken advantage of the caching architecture of today's processors to improve performance.

SUMMARY OF THE INVENTION

An improved object loader is provided that is designed to take advantage of the caching architecture of many of today's processors to improve performance. Some of today's most advanced processors, like the PENTIUM processor, have a two-level caching scheme utilizing both a primary cache and a secondary cache, where data contained in the primary cache is accessible 50 to 150 times faster than data in main memory. The improved object loader uses a hash table and an object handle table to load objects, where each of these tables is designed and utilized in such a manner so as to take full advantage of the processor's caching architecture to increase system performance.

In the hash table of the improved object loader system, the hash buckets are actually chains of buckets, and object information is stored in the chains of buckets. The improved object loader is designed such that when inserting object information into the hash table, collisions intentionally occur so that information pertaining to functionally-related objects is stored in the same chain of buckets. The buckets of the hash table are configured to be the same size as a cache line (e.g., 32 bytes). As a result, when a program uses the object loader to access related objects, which is a normal occurrence, there is a performance savings because the bucket containing the object information for the related objects may already be loaded into the primary cache, especially if object information contained in the same bucket has recently been accessed. In this manner, primary cache hits are increased and main memory accesses are decreased. Furthermore, the improved object loader compresses the identifiers of the objects in the system to reduce memory requirements of the object loader in general and, more specifically, the object handle table.

The object handle table is similarly configured to the hash table so as to take advantage of the caching architecture of the processor. That is, information (including memory addresses) for a group of functionally-related objects is stored in each entry of the object handle table, and each entry is designed to be the same size as a cache line. Consequently, as related objects are accessed, primary cache hits increase and primary cache misses decrease. Since the identifiers of the objects are compressed, the object handle table can store information for more objects into one entry than would otherwise fit. Furthermore, the information for the objects in the entries of the object handle table is compressed, which also leads to storing information for more objects into one entry than would otherwise fit.

In accordance with a first aspect of the present invention, a method is provided in a computer system for storing data related to objects into a hash table having buckets. The method groups the objects into groups of functionally-related objects and stores the data from each group into the hash table such that the data for functionally-related objects of each group is stored into a same bucket.

In accordance with a second aspect of the present invention, a method is provided in a computer system for creating an object handle table having entries containing a predetermined number of memory addresses for objects stored in a memory of the computer system. The method groups the objects into groups of functionally-related objects and stores memory addresses for the predetermined number of functionally-related objects into a single entry in the object handle table.

In accordance with a third aspect of the present invention, a method is provided for accessing objects located at memory addresses in a memory of a computer system having a hash table with a plurality of buckets. Each bucket has entries containing an object identifier for an object and a reference to a field in an object handle table for the object. The field in the object handle table contains a memory address for the object. The method receives an identifier of a requested object for which a memory address is requested, inputs the identifier into a hash function to generate an index referring to one of the buckets in the hash table, and accesses the bucket using the index. The method further searches the bucket for the entry of the requested object by matching the identifier in each entry against the identifier of the requested object, and accesses the entry of the requested object to obtain a reference to a field in the object handle table for the requested object. The method also accesses the object handle table using the reference to access the field containing the memory address of the requested address and returns the memory address of the requested object.

In accordance with a fourth aspect of the present invention, a method is provided for accessing objects located at memory addresses in a memory of a computer system connected to a network connected to remote computer systems. The computer system has a hash table with a plurality of buckets each having entries containing an object identifier for an object and memory address storage information for the object. The method receives a request from a caller for a memory address of a requested object where the request contains a network-wide unique identifier for the requested object. The method compresses the network-wide unique identifier into a system-wide unique identifier, inputs the system-wide unique identifier into a hash function to generate an index referring to one of the buckets in the hash table, and accesses the bucket using the index. The method further searches the bucket for the entry of the requested object by matching the object identifier in each entry against the system-wide unique identifier, accesses the entry of the requested object to obtain the memory address storage information, utilizes the memory address storage information to locate the memory address of the requested object, and returns the memory address of the requested object to the caller.

BRIEF DESCRIPTION OF THE DRAWINGS

FIG. 5A depicts the format of a globally unique identifier as used in a preferred embodiment of the present invention.

FIG. 5B depicts the format of an object identifier as used in a preferred embodiment of the present invention.

FIG. 5C depicts the mapping table of FIG. 4 in greater detail.

FIG. 6 depicts the hash table of FIG. 4 in greater detail.

FIG. 8 depicts the object handle table of FIG. 4 in greater detail.

DETAILED DESCRIPTION OF THE INVENTION

Figure 1:
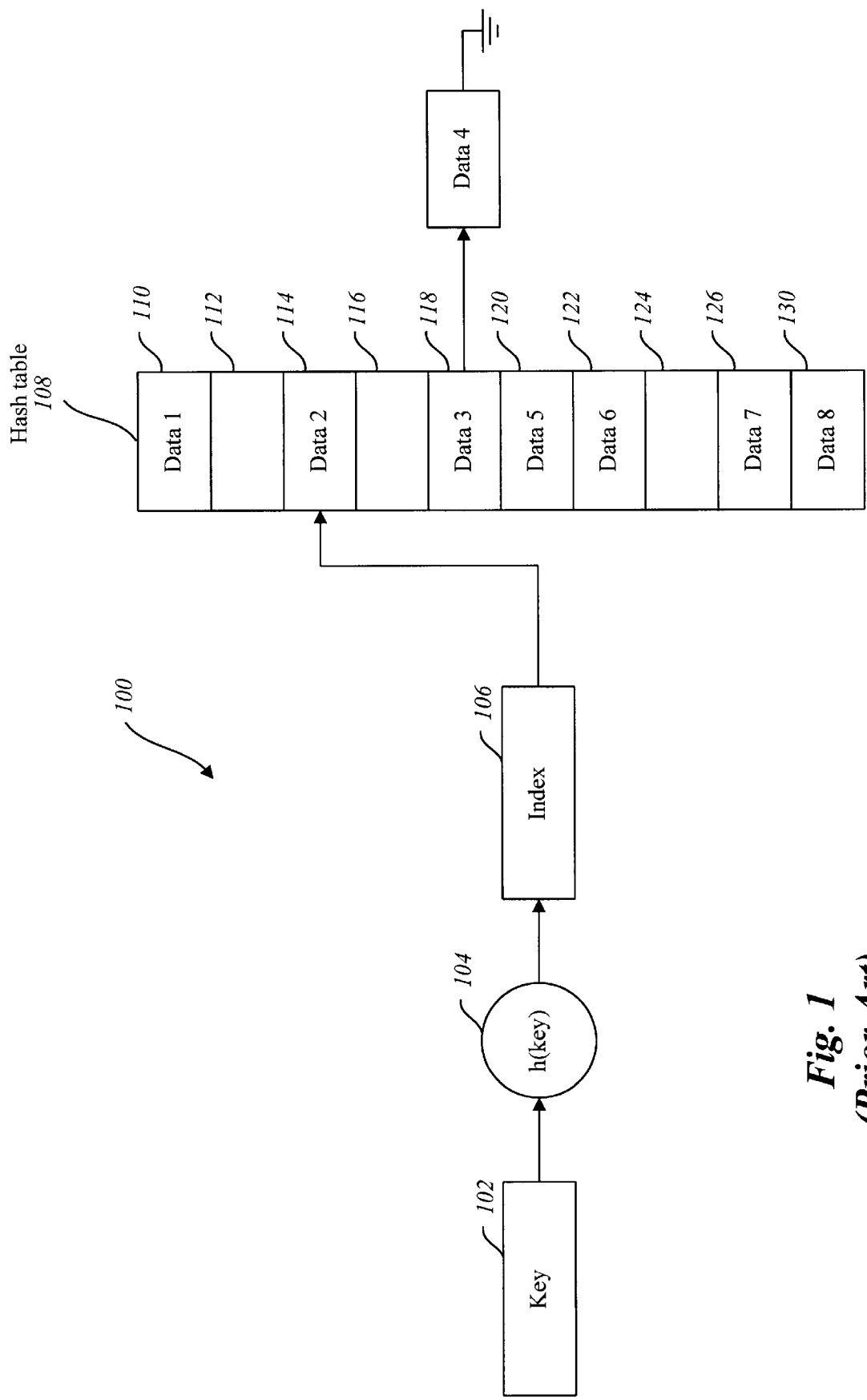
FIG. 1 depicts a conventional hashing mechanism utilized by a conventional object loader.

A preferred embodiment of the present invention provides an improved object loader that is designed to take advantage of the caching architecture of many of today's processors to improve performance. Some of today's most advanced processors, like the PENTIUM processor, have a two-level caching scheme utilizing both a primary cache and a secondary cache, where data contained in the primary cache is accessible 50 to 150 times faster than data in main memory. The improved object loader uses a hash table and an object handle table to load objects. Each of these tables is designed and utilized in such a manner so as to take full advantage of the processor's caching architecture to increase system performance.

In the hash table of the improved object loader system, the hash buckets are actually chains of buckets, and object information is stored in the chains of buckets. The improved object loader is designed such that when inserting object information into the hash table, collisions intentionally occur so that information pertaining to functionally-related objects is stored in the same chain of buckets. The buckets of the hash table are configured to be the same size as a cache line (e.g., 32 bytes). As a result, when a program uses the object loader to access related objects, which is a normal occurrence, there is a performance savings because the bucket containing the object information for the related objects may already be loaded into the primary cache, especially if object information contained in the same bucket has recently been accessed. In this manner, primary cache hits are increased and main memory accesses are decreased. Furthermore, the improved object loader compresses the identifiers of the objects in the system to reduce memory requirements of the object loader in general and, more specifically, the object handle table.

The object handle table is similarly configured to the hash table so as to take advantage of the caching architecture of the processor. That is, information (including memory addresses) for a group of functionally-related objects is stored in each entry of the object handle table, and each entry is designed to be the same size as a cache line. Consequently, as related objects are accessed, primary cache hits increase and primary cache misses decrease. Since the identifiers of the objects are compressed, the object handle table can store information for more objects into one entry than would otherwise fit. Furthermore, the information for the objects in the entries of the object handle table is compressed, which also leads to storing information for more objects into one entry than would otherwise fit.

Overview

When an application program wants to access an object, such as a database object, the application program typically has an identifier of the object but does not have its memory address. However, before utilizing the object, the application program needs to obtain the memory address of the object. As previously stated, it is the responsibility of the object loader to obtain a memory address for an object and to pass the memory address to the application program so that the application program may then utilize the object. In performing this functionality, the object loader may determine that the object is not yet loaded into memory. In this situation, the object loader must load the object into memory.

Figure 2:
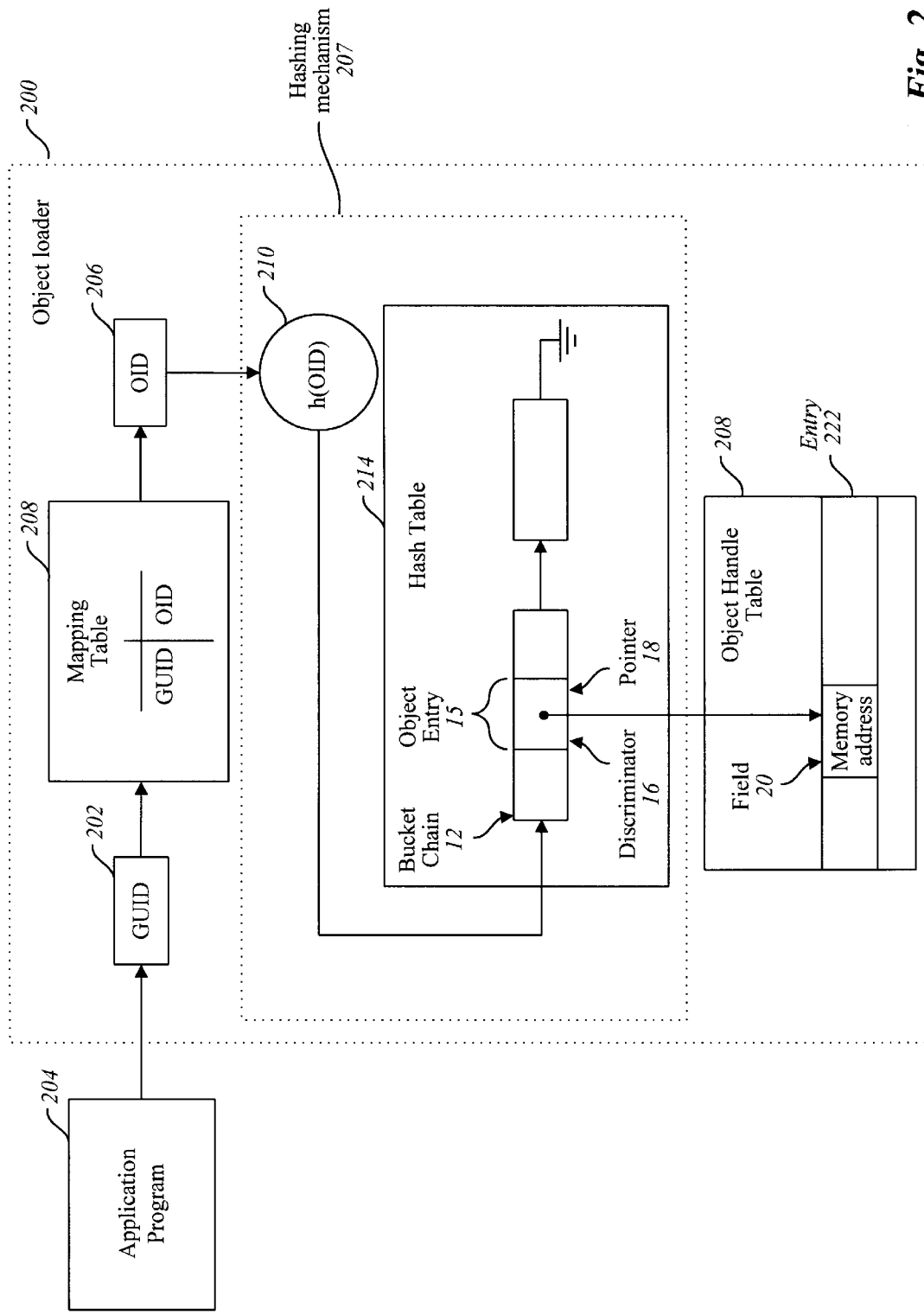
FIG. 2 depicts a functional diagram of the improved object loader of a preferred embodiment of the present invention.

In a preferred embodiment, each object has an associated global unique identifier (GUID), which is a unique identifier differentiating one object from all other objects on all other computers on the network. The GUID is a 16-byte identifier. As shown in FIG. 2, the improved object loader 200 receives a GUID 202 from the application program 204, and after receiving the GUID, the improved object loader converts the GUID into an 8-byte identifier, known as an object identifier (OID) 206, by using a mapping table 208. By converting the GUID into an OID, the amount of space used to refer to objects within the object loader 200 is minimized, as well as the amount of space needed to store entries in the object handle table 208, which is discussed below. Upon converting the GUID 202 to an OID 206, the improved object loader 200 inputs the OID into a hashing mechanism 207 to obtain the memory address of the object.

In utilizing the hashing mechanism 207, the improved object loader 200 hashes the OID 206 using a hash function 210 into a 24-bit index indicating a particular chain of buckets 212 in the hash table 214. The size of the hash table 214 can thus contain up to $2^{24}$ bucket chains. One skilled in the art will appreciate that the hash table 214 may initially contain fewer bucket chains and, over time, grow to contain up to $2^{24}$ bucket chains. Each bucket chain stores information ("object entries") for functionally-related objects, because it is recognized that application programs usually use groups of related objects together. It can be ensured that object entries for functionally-related objects are stored in the same bucket chain because of the way in which GUIDs are assigned to objects and because of the design of the hash function. GUIDs are assigned to objects such that functionally-related objects have an equivalent portion of their GUID. The hash function 210 of the improved object loader 200 is designed to cause collisions between objects having an equivalent portion of their GUID, thus ensuring that functionally-related objects are stored in the same bucket chain. Since each bucket is configured to be the size of a cache line, when an object is accessed the entire bucket is cached. Thus, functionally-related objects, which may be stored in the same bucket, are automatically brought into the primary cache. Therefore, a main memory access is saved when information for one of the functionally-related objects in the bucket is then accessed.

By storing object entries for related objects in the same bucket chain and by configuring each bucket to be the same size as a cache line, significant performance savings can occur. That is, once a bucket chain is searched, each bucket accessed is stored in the primary cache by the processor. Thus, if the bucket chain is searched again while the accessed buckets are still in the primary cache, this search will benefit from the reduced access time of the primary cache. In this manner, the improved object loader is designed to take advantage of the caching architecture of many of today's advanced processors to provide improved performance.

Each object entry (e.g., 215) in the hash table 214 contains a discriminator 216 and a pointer 218. The discriminator 216 is a 12-bit number that is used in place of the OID to help identify an object. The use of a 12-bit discriminator allows identifiers for many objects to be stored in a 32-byte cache line. (If the 8-byte OID were stored in a bucket, only a couple of object identifiers could fit into one bucket.) The discriminator is a derivative of the OID, but there is not a one-to-one mapping between a discriminator and an object. Therefore, comparing the discriminator to an object entry yields a likely match, but not necessarily an exact match. To determine if an object entry actually matches an OID, the OID of the object handle table is checked. The use of the discriminator is further described below. The pointer 218 refers to a field 220 in the object handle table 208, which contains one field for each object in the system. Each object handle table field contains either a memory address for the object if it is currently loaded into memory or an indication that the object needs to be loaded. The object handle table 208 stores a number of fields of information for functionally-related objects into one entry (e.g., 222), which is the size of a cache line, thus leading to reduced memory access time. Furthermore, the information for the related objects in each entry is compressed so as to store information for more objects into an entry than would otherwise fit.

After hashing the OID to generate the index, the improved object loader 200 calculates the discriminator from the OID and attempts a match against the discriminators in each object entry in the chain of buckets. As each bucket is searched, the processor loads it into the primary cache. Thus, if an object entry in a bucket is accessed before the bucket is removed from the primary cache, performance significantly improves. The improved object loader groups object entries for related objects into the same bucket chain to take advantage of this performance improvement. When a discriminator match is made, the pointer in the object entry 218 refers to a field 220 in an entry 222 in the object handle table 208 for the object. If the field 220 contains a memory address, the object loader returns this memory address to the application program 204 so that the application program may utilize the object. However, if the field 220 in the object handle table 208 indicates that the object is not loaded into memory, the object is accessed remotely and stored into local memory. After storing the object into local memory, the object loader 200 inserts the memory address for the object into the object handle table field 220 and passes the memory address to the application program 204.

To more clearly describe the operations of the improved object loader 200, an example is now provided. The object loader receives a 16-byte GUID 202 (e.g., 1234567890123456) indicating an object for which the memory address is requested and converts the GUID into an 8-byte OID 206 (e.g., 12345678) using the mapping table 208. The object loader then inputs the OID 206 into a hash function 210 which yields an index referring to a bucket chain 212 that stores object information for the requested object as well as object information for functionally-related objects. For example, the last 3 bytes of the OID may be the same for each group of functionally-related objects. That is, the last 3 bytes of "678" may indicate one function and the last 3 bytes of "689" may indicate another function. The hash function would then hash OIDs that have the same last 3 bytes to the same index, such as "3" indicating the third bucket chain. Then, a 12-bit discriminator 216 is derived from the OID 206 and is matched against the discriminators in each object entry in the bucket chain 212 until finding an object entry 215 having a discriminator 216 matching the discriminator calculated from the OID 206. Upon locating an object entry 215 with a matching discriminator, the pointer 218 contained in the object entry is used to access a field 220 in an object handle table entry 222 containing the memory address for the object identified by the OID 206. However, if the entry 222 does not contain a memory address, the object is loaded into memory and the memory address is stored into the entry.

As previously stated, the improved object loader takes advantage of the caching architecture of many advanced processors by grouping information pertaining to functionally-related objects together, compressing this object information, and storing this object information into a chain of buckets where each bucket is configured to be the exact size of a cache line. Furthermore, each entry in the object handle table contains compressed information for functionally-related objects, and each entry is configured to be the exact size of a cache line. As a result, significant performance improvements are achieved.

Implementation Details

Figure 3:
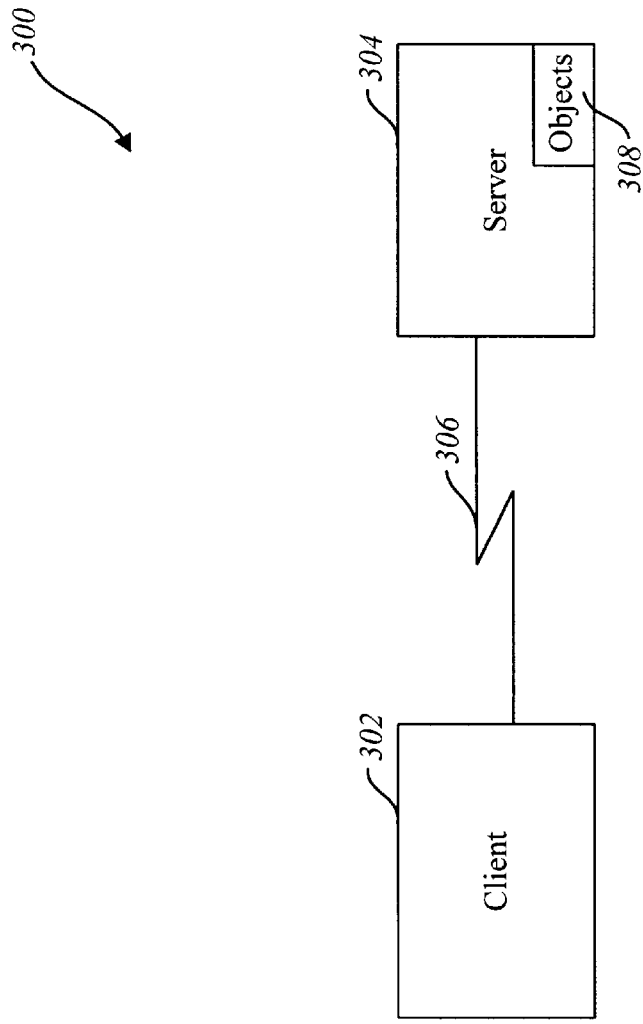
FIG. 3 depicts a data processing system that is suitable for practicing a preferred embodiment of the present invention.

FIG. 3 depicts a data processing system 300 that is suitable for practicing a preferred embodiment of the present invention. The data processing system 300 contains a client computer 302 and a server computer 304 interconnected via a network 306. Although only two computers are depicted on the network 306, it should be appreciated that many more computers may exist on the network. In the data processing system 300, the server computer 304 has a number of objects 308 that are utilized by other entities across the network 306, such as a computer program on the client computer 302. In a preferred embodiment of the present invention, the server computer 304 stores database objects like records, fields of a record, or tables; however, one skilled in the art will appreciate that the techniques described herein can be utilized with other types of objects. In the data processing system 300, a computer program on the client computer 302 utilizes one or more of the objects 308 on the server computer 304 and thus interacts with the improved object loader to retrieve the object from the server computer and to load the object into memory so that the computer program may access it.

Figure 4:
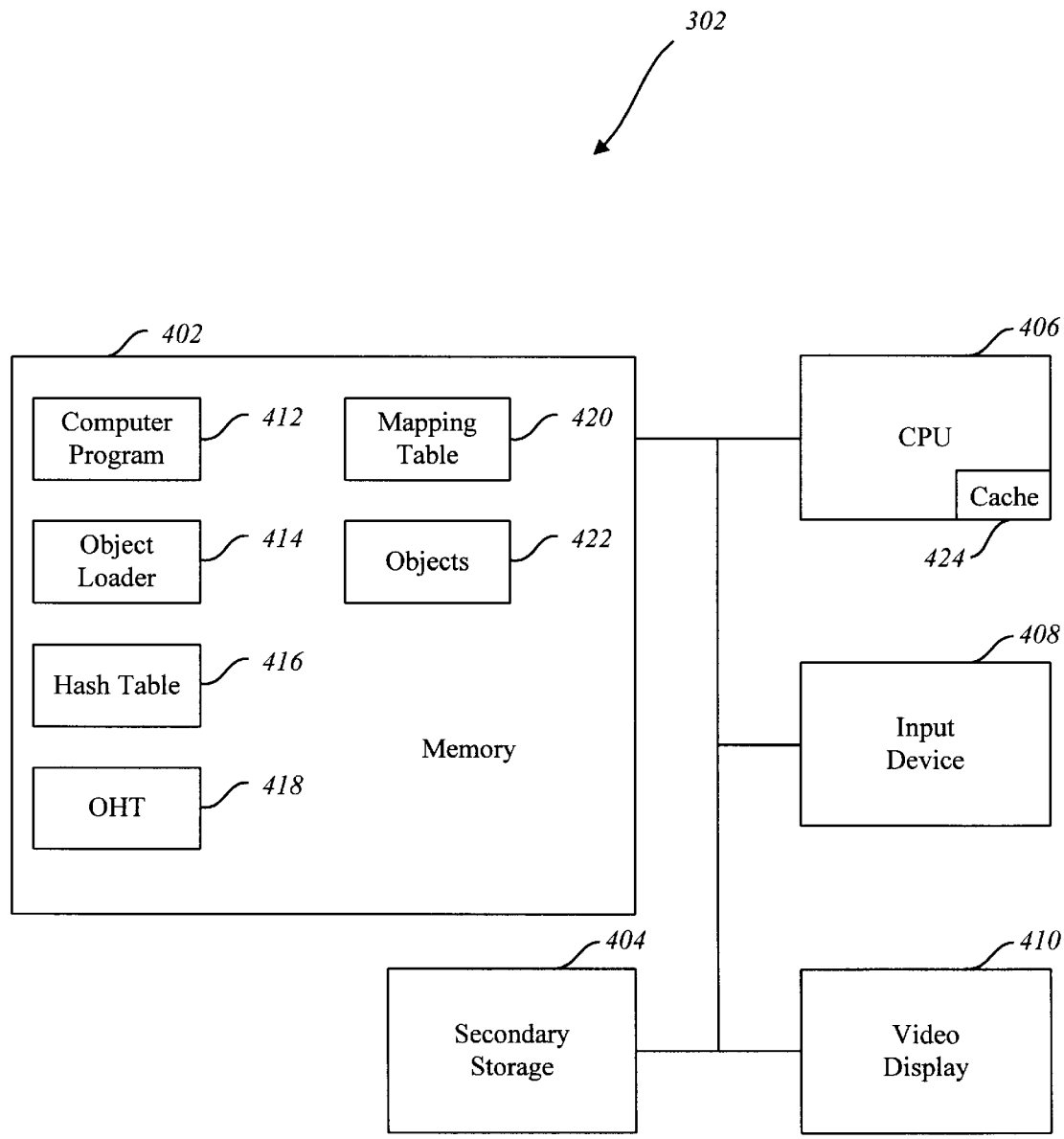
FIG. 4 depicts a more detailed diagram of the client computer of FIG. 3.

FIG. 4 depicts the client computer 302 in greater detail. One skilled in the art will appreciate that the server computer 304 may have similar components. The client computer 302 has a main memory 402; a secondary storage device 404; a central processing unit (CPU) 406, such as the PENTIUM processor available from Intel Corporation of Santa Clara, Calif.; an input device 408; and a video display 410. The main memory 402 contains a computer program 412 that accesses objects, the improved object loader 414, the hash table 416, the object handle table 418, the mapping table 420, and various objects 422, which have been loaded into memory and which are being utilized by the computer program 412. The CPU 406 has a memory cache 424. Although the memory cache 424 is described as being part of the CPU 406, one skilled in the art will appreciate that it may be located in another part of the client computer 302.

When attempting to utilize an object, the computer program 412 has a GUID that identifies the object, but needs a memory address to be able to utilize the object; therefore, it invokes the improved object loader 414. The improved object loader determines whether the object is currently loaded into memory 402 and, if so, returns the memory address of the object to the computer program 412 so that it may utilize the object. In performing this processing, the improved object loader 414 utilizes the mapping table 420, the hash table 416, and the object handle table 418. The mapping table 420 is utilized to convert the GUID to an OID, thus saving space within the memory 402. After conversion, the OID is then hashed into an index referring to a bucket chain in the hash table 418. This bucket chain contains an object entry for the requested object which contains a pointer into the object handle table 418 where the memory address for the object is contained. However, if the object handle table 418 does not contain the memory address, the object loader 414 obtains the object from the server computer 304, loads the object into memory 402, stores the memory address into the object handle table, and returns the memory address to the computer program 412.

FIG. 5A depicts a diagram of a GUID 500. The GUID 500 contains two parts: an origin part 502 and a sequence part 504. The origin part is 12 bytes in length and uniquely specifies the object's function (i.e., the functional unit of the object). The sequence part 504 is a sequential number uniquely identifying a particular object in a functional unit. The GUID 500 is created by the originator of the object, such as an application program. The originator designates the origin part 502 so that it is unique across the entire network. The origin part 502 is used to specify to which functional unit the object belongs. For example, the originator may create database objects relating to both employee information and capital assets of a company. The originator designates the origin part 502 such that it distinguishes objects by their functional unit. For instance, all objects functionally related to employee information may have an origin part of 33157, whereas all objects functionally related to capital assets may have an origin part of 33158. Upon designating the origin part 502 for an object, the originator designates the sequence part 504, which is a sequential number unique to all other objects in the particular functional unit and which indicates a particular object within the functional unit. Since the sequence part 504 is a sequential number, it indicates the chronological order in which the objects in a given functional unit have been created. Using this method for assigning GUIDs to objects, all objects having the same origin part 502 are ensured to be functionally related. Furthermore, two objects having consecutive sequence parts are ensured to have been created temporally close to each other. It should be noted that there may be more than one originator creating objects for a particular functional unit (e.g., employee database objects), and therefore, more than one originator may designate the same origin part 502 to objects. One skilled in the art will appreciate that many other schemes can be used to ensure that functionally-related objects have the same origin part 502.

As previously stated, the GUID is mapped to an OID to save space in the memory 302. The OID 506, depicted in FIG. 5B, is 8 bytes in length, and contains a 4-byte compressed origin part 508 and a 4-byte sequence part 510. The sequence part 510 is the same as the sequence part 504 of the GUID 500. The compressed origin part 508 contains a value uniquely identifying a particular origin part 502. The compressed origin part 508 is created by sequentially assigning unique numbers to each unique origin part 502 observed by the improved object loader. Each unique number is stored in the mapping table 520 as depicted in FIG. 5C. The mapping table 520 contains a mapping of compressed origin parts 528 of OIDs to the corresponding GUID origin parts 530. The mapping table 520 is implemented as a hash table. However, one skilled in the art will appreciate that other data structures can be used to implement the mapping table 520. Every time that the improved object loader encounters an origin part of a GUID that is not contained within the mapping table 520, it creates a new entry in the mapping table and assigns a unique sequential number to the origin part of the GUID. If, during the conversion of a GUID to an OID, a GUID origin part has already been encountered and an entry exists in the mapping table 520, the corresponding compressed origin 508 found in the mapping table entry is used.

Figure 7:
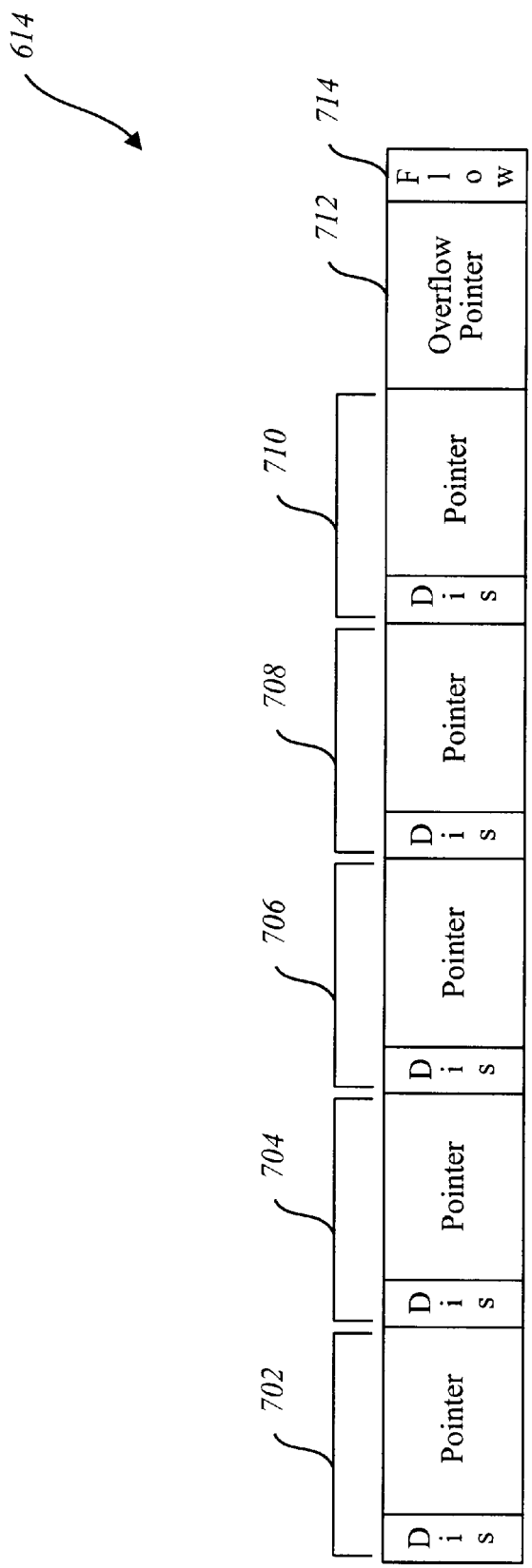
FIG. 7 depicts a bucket of the hash table of FIG. 6 in greater detail.

FIG. 6 depicts the hash table 416 in greater detail. The hash table 416 contains chains of buckets 602–612. Each of the chains 602–612 is a number of individual buckets (e.g., buckets 614–624) linked together. Each bucket is configured to be the same size as the cache lines in the cache 424 of the CPU 406 (e.g., 32 bytes). Additionally, each bucket contains a number of object entries, with each object entry containing information for one object. FIG. 7 depicts a more detailed diagram of bucket 614, although the other buckets in hash table 416 are similarly configured. The bucket 614 is 32 bytes in length and contains five object entries 702–710, an overflow pointer 712, and a flags field 714. Each object entry 702–710 contains a 12-bit discriminator and a 4-byte pointer. Although one method for creating the discriminator will now be described, one skilled in the art will appreciate that other methods may be used. The discriminator is obtained by mapping the high-order 56 bits (7 bytes) of the OID onto 8 bits and the low-order 8 bits (1 byte) onto 4 bits. The high-order 7 bytes of the OID are mapped to the high-order 8 bits of the discriminator by exclusively oring the 7 bytes together to yield the 8 high-order bits of the discriminator. The low-order 8 bits of the OID are mapped onto 4 bits by exclusively oring the two consecutive 4-bit groups together to yield the low-order 4 bits of the discriminator. It should be appreciated that there is not a one-to-one mapping between an OID and a discriminator. As such, discriminators are used to determine not an exact match, but a likely match, as will be further described below. The 4-byte pointer portion of each object entry 702–710 refers to a particular field in the object handle table for the object. The overflow pointer 712 is a 4-byte pointer referring to the next bucket in the chain of buckets. The flags 714 are 4 bits containing status information of the object entries 702–710 like whether they are empty. The entire bucket 614 is exactly 32 bytes in length so as to correspond with the cache line size of the CPU cache.

Figure 8:
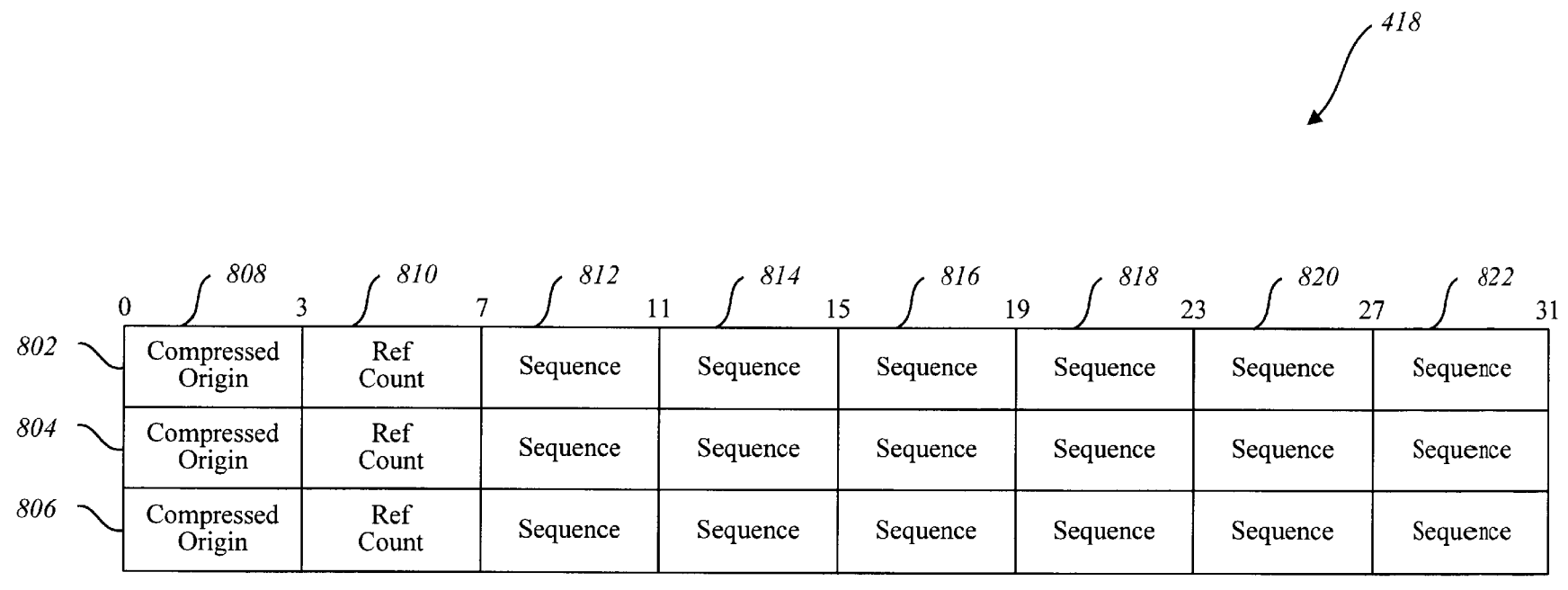

FIG. 8 depicts the object handle table 418 in greater detail. The object handle table 418 contains a number of entries 802, 804, and 806. Each entry 802, 804, and 806 contains information relating to six objects that share a common origin part of their GUID and OID. Thus, the objects referred to in one of the entries are ensured to be functionally related. Each entry contains the 4-byte compressed origin part of the OID 808, a 4-byte reference count 810, and one 4-byte sequence field 812-822 for each related object in the entry. Each entry 802–806 is exactly 32 bytes in length so as to correspond with the size of the cache line. The reference count field 810 contains the number of references outstanding on the objects referred to in the entry. The reference count is used to determine when the entry can be removed from the object handle table. Each sequence field 812–822 contains either the sequence part of the OID for an object if the object has not been loaded into memory, or it contains the actual 4-byte pointer to the object. By storing information of related objects into one cache line, primary cache hits are increased and main memory access is decreased.

Figure 9A:
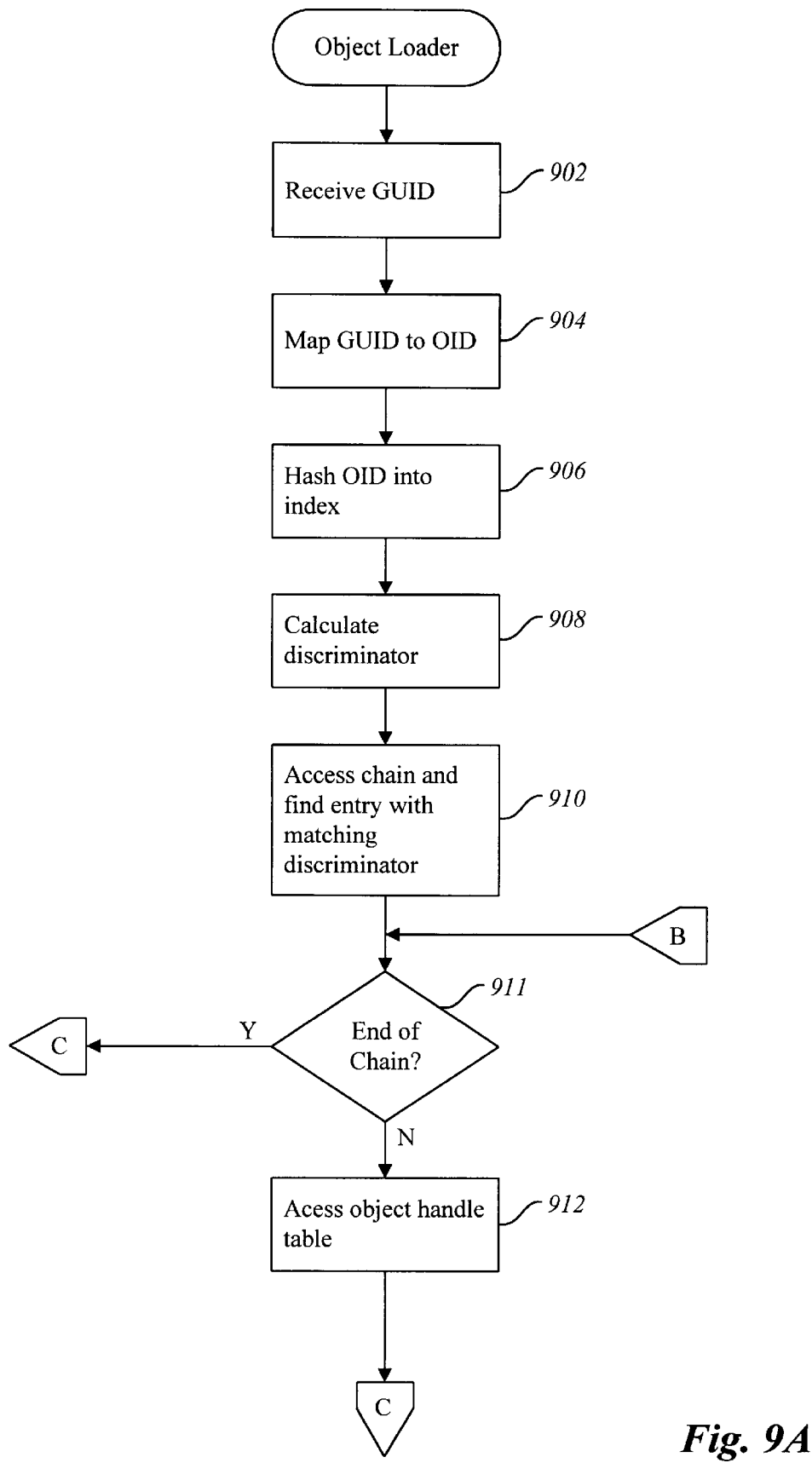
FIGS. 9A, 9B and 9C depict a flowchart of the steps performed by the improved object loader depicted in FIG. 4.
Figure 9B:
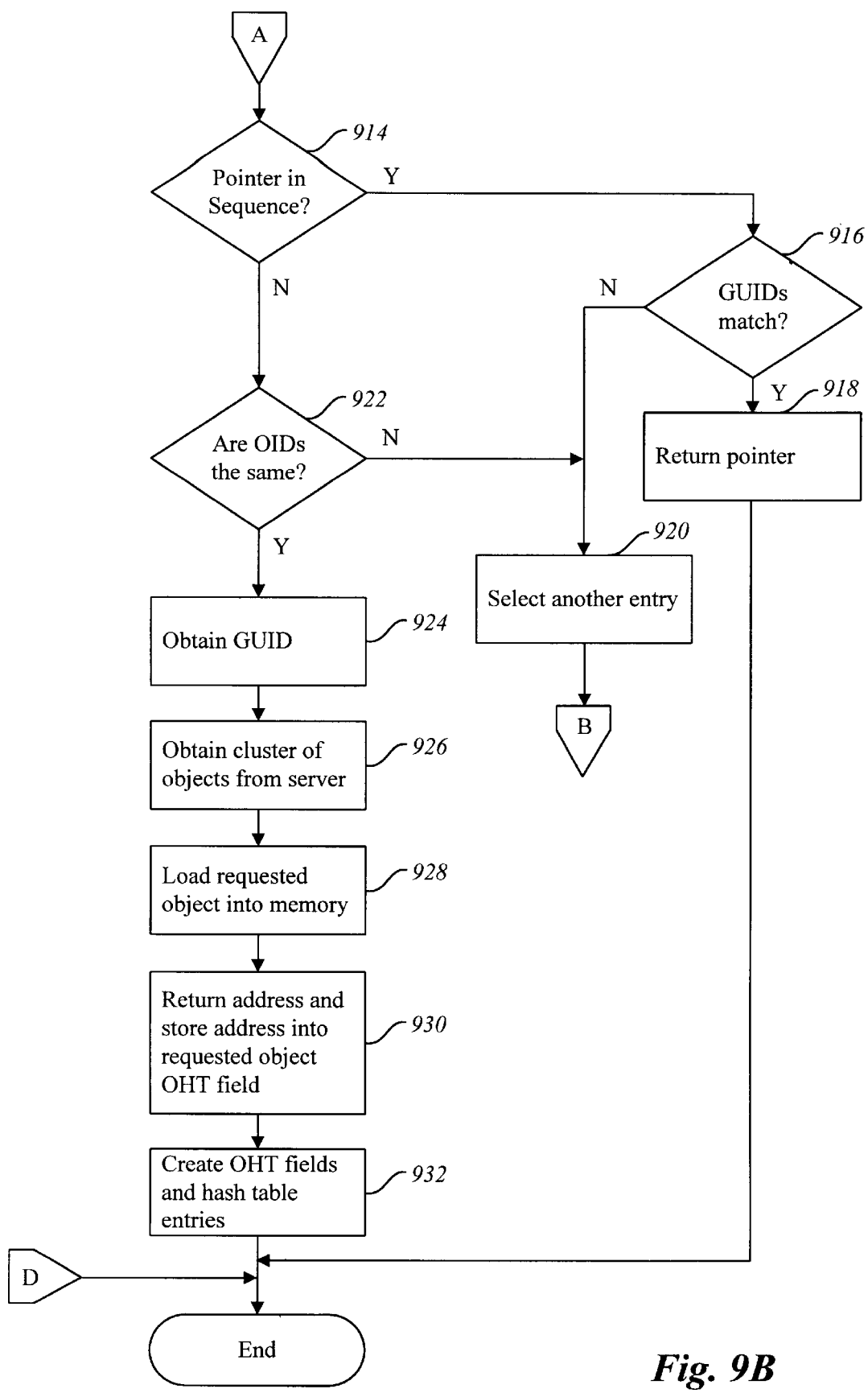
Figure 9C:
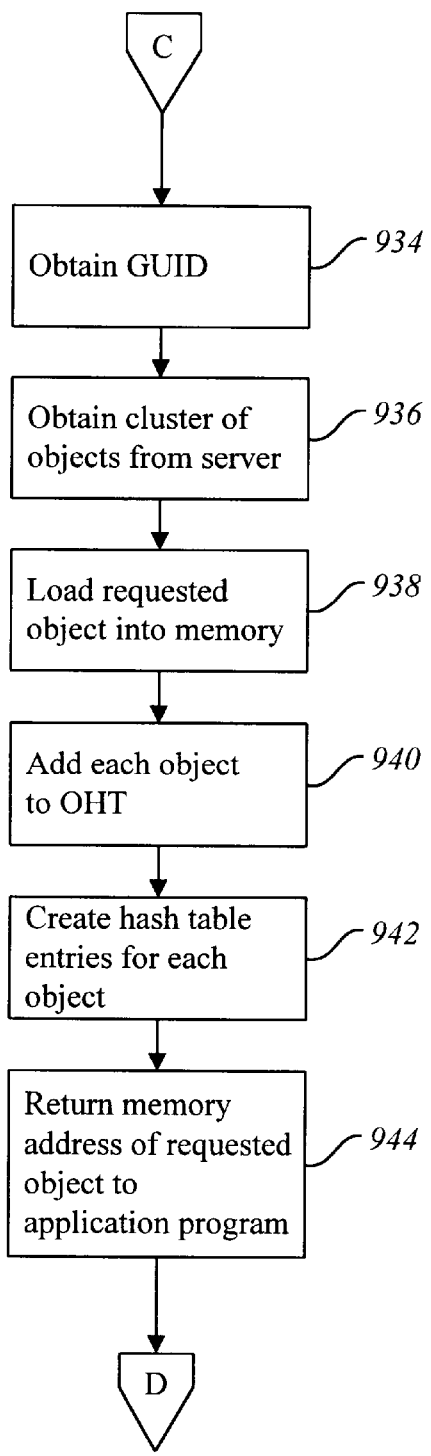

FIGS. 9A, 9B and 9C depict a flowchart of the steps performed by the improved object loader. As will be apparent from the following description, accesses of both the hash table and the object handle table benefit from the caching architecture of the processor. The first step performed by the object loader is to receive a GUID from the application program, where the application program requests the memory address for the object specified by the GUID (step 902). The object loader maps the GUID to the OID (step 904). This step is performed by accessing the mapping table and determining if the origin part of the GUID already exists and, if not, assigning a new sequential number to the origin part of the GUID and creating an entry in the mapping table. After mapping the GUID to an OID, the object loader hashes the OID into an index into the hash table (step 906). In this step, the object loader hashes the OID into the index by mapping the high-order 7 bytes (56 bits) of the 8-byte OID into the 24-bit index. By utilizing the high-order 56 bits, each bucket chain is guaranteed to have object entries for objects that are both functionally related and temporally related. That is, the high-order 32 bits of the 56 bits correspond to the compressed origin part, thus ensuring that functionally-related objects are stored in the bucket. Additionally, the remaining 24 bits of the 56 bits are the most significant 24 bits of the sequence part. Therefore, object entries for objects with both the same origin part (i.e., functionally-related objects) and the same most significant 24 bits of the sequence part (i.e., temporally-related objects) will have their OID hash to the same index and, consequently, will be stored in the same bucket. This step is performed by dividing the 56 bits into two groups of 28 consecutive bits. In each group, the first four consecutive high-order groups of 12 bits are exclusively or'd together which leaves 4 bits remaining. The resulting value from the exclusive or operation has its low-order 4 bits exclusively or'd with the remainder 4 bits to yield a 12-bit value for each 28-bit group. The 12-bit value for each 28-bit group then comprises half of the 24-bit index. It should be appreciated that this hash function in combination with the manner in which GUIDs are assigned to objects leads to information for both functionally-related and temporally-related objects being stored in the same chain of buckets.

After creating the index, the object loader calculates the discriminator as previously described (step 908). After calculating the discriminator, the object loader accesses the chain of buckets indicated by the index calculated in step 906 and matches the discriminator calculated in step 908 to the discriminator in each object entry in the chain of buckets to find a matching object entry (step 910).

While searching for an object entry with the matching discriminator, the object loader determines if it has reached the end of the bucket chain (step 911). If the end of the bucket chain has been reached, no object entry for this requested object is contained in the bucket chain, and as such, the object must be obtained from the server as reflected by steps 934–944 in FIG. 9C. To obtain the requested object, the object loader first obtains the GUID received in step 902 (step 934). The object loader then requests the object indicated by the GUID from the server computer, and the server computer sends a number of related objects ("a cluster") to the object loader (step 936). In this step, the server computer is prefetching a group of related objects and sending them to the object loader in the hope that one of these objects will be utilized soon which would then save the overhead associated with accessing the server computer. The server computer determines the group of objects by selecting a predefined number of objects having GUIDs that sequentially follow the GUID of the requested object. After receiving the cluster of objects, the object loader loads the requested object into memory (step 938). When loading the requested object into memory, the object loader performs processing to facilitate the application program's use of objects that are referred to by the requested object. Each object in the system usually contains a reference (i.e., a GUID) to one or more other objects. Upon loading the requested object into the memory, the object loader converts the GUIDs into OIDs, determines the appropriate fields in the object handle table for the referenced objects, and replaces these GUIDs with references to the fields in the object handle table for the referenced objects. If no fields are currently created for a referenced object, a field is created as described below.

Next, the object loader adds each object returned to the object handle table (step 940). In this step, the object loader accesses the object handle table for each object to determine if there is an entry in the object handle table that has an origin part matching the origin part of the object's OID. If there is no such entry or if there is such an entry but all of its sequence fields are full, the object loader creates an entry in the object handle table by inserting the origin part of the object's OID into the origin field 808 and by inserting the sequence part of the OID into the first sequence field 812. Of course, when adding the requested object into the object handle table, its memory address is stored in the sequence field. If there is an entry in the object handle table that has an origin part matching the origin part of the object's OID and the entry has an empty sequence field, the sequence part of the OID for the object is inserted. After adding each object to the object handle table, the object loader creates hash table entries for each object (step 942). In this step, the object loader has received the GUID for each object and converts the GUIDs into OIDs as described in step 904 and hashes these OIDs into indexes into the hash table as described in step 906. The object loader then accesses the indicated bucket chain and inserts an object entry into the first empty entry in the bucket chain. If no empty entries are found and the end of the bucket chain is reached, a new bucket is allocated and added to the end of the bucket chain. In creating the object entry, the object loader calculates a discriminator as described above in step 908 and inserts a reference to the object's field in the object handle table as determined in step 940. After creating object entries in the hash table for each object, the object loader returns the memory address of the requested object to the application program and processing ends.

If the end of the chain has not been reached in step 911 and an object entry with a matching discriminator has been found, the object loader accesses the object handle table using the pointer contained in the object entry (step 912). After accessing the object handle table, the object loader determines if the referred to sequence field contains a pointer (step 914). The last bit of the field indicates whether it is a pointer or sequence. If the sequence field contains a pointer, the object loader accesses the object using the pointer and compares the GUID contained in the object to the GUID received in step 902 to determine if there is a match (step 916). Each object stores a copy of its own GUID. In this step, the GUIDs are checked to ensure that the correct object entry in the hash table has been accessed. This processing must be done because the discriminator does not guarantee an exact match, only a likely match. If the GUIDs match, the object loader returns the memory address to the application program (step 918) and processing ends. If, however, the GUIDs do not match, the object loader selects the next object entry from the bucket chain containing a matching discriminator (step 920) and proceeds to step 911 where it is determined whether the end of the bucket chain has been reached.

If the sequence field does not contain a pointer, the object loader determines if the OID of step 904 matches the OID contained in the object handle table (step 922). If the OIDs do not match, processing continues to step 920 and another object entry is selected. If, however, the OIDs match, the object loader obtains the GUID received in step 902 (step 924). After obtaining the GUID, the object loader obtains the object from the server computer (step 926). In this step, the object loader accesses the server computer 304 via the network 306 and receives a cluster of objects. After obtaining the cluster of objects, the object loader loads the object into memory as described in step 938 (step 928). After loading the object into memory, the object loader returns the memory address of the object to the application program and stores the memory address into the sequence field in the object handle table (step 930). After returning the memory address to the application program and storing the address into the object handle table, the object loader adds each object to the object handle table as described in step 940 and creates hash table entries for each object as described in step 942 (step 912). After performing this processing, processing ends.

While the present invention has been described with reference to a preferred embodiment thereof, those skilled in the art will know of various changes in form and detail that may be made without departing from the spirit and scope of the present invention as defined in the appended claims.

What is claimed is:

1. A method for accessing objects located at memory addresses in a memory of a computer system connected to remote computer systems via a network, the computer system having a hash table with a plurality of chains of buckets, each bucket having entries containing an identifier for an object and a reference to a field in an object handle table for the object, the field in the object handle table containing a memory address of the object, comprising the steps of:

receiving a request from a caller for a memory address of a requested object, the request containing a network-wide object identifier of the requested object;

converting the network-wide object identifier into a system-wide object identifier;

inputting the system-wide object identifier into a hash function to generate an index referring to one of the chains of buckets in the hash table;

accessing the bucket chain using the index;

searching the bucket chain for the entry of the requested object by matching the identifier in each entry against the system-wide object identifier of the requested object;

accessing the entry of the requested object to obtain a reference into the object handle table;

accessing the object handle table using the reference to identify the field containing the memory address of the requested object; and returning the memory address of the requested object contained in the identified field to the caller.

2. The method of claim 1 wherein each object in the memory of the computer system contains the network-wide object identifier for the object, wherein the identifier in each entry in the hash table does not uniquely identify an object, wherein the step of searching the bucket chain includes the step of matching a portion of the system-wide object identifier to the identifier in each entry, and wherein the step of accessing the object handle table includes:

accessing the object at the memory address contained in the identified field;

determining if the accessed object is the requested object by comparing the network-wide object identifier of the requested object to the network-wide object identifier of the accessed object; and when it is determined that the accessed object is not the requested object, selecting an entry in the bucket chain;

accessing the object handle table using the reference in the selected entry to locate the field in the object handle table containing the memory address of the requested object; and returning the memory address of the requested object contained in the located field to the caller.

3. The method of claim 1 wherein the step of converting the network-wide object identifier into a system-wide object identifier includes compressing the network-wide object identifier so that the system-wide object identifier requires less space.

4. The method of claim 1 wherein a plurality of the fields in the object handle table do not contain memory addresses, wherein the step of accessing the object handle table includes the steps of:

determining whether the identified field in the object handle table does not contain the memory address of the requested object; and when the identified field does not contain the memory address of the requested object, accessing the requested object from a remote location on the network using the network-wide object identifier; and loading the requested object into the memory at a memory address.

5. The method of claim 4 wherein the identifier in each entry in the hash table does not uniquely identify an object, wherein each field that does not contain a memory address in the object handle table contains a system-wide object identifier, wherein the step of searching the bucket chain includes the step of matching a portion of the system-wide object identifier to the identifier in each entry, and the method further including the steps of:

comparing the system-wide object identifier of the requested object to the system-wide object identifier of the identified field in the object handle table to determine the equivalence thereof responsive to determining whether the field in the object handle table does not contain the memory address of the requested object; and when it is determined that the system-wide object identifier of the requested object is not equivalent to the system-wide object identifier of the field, selecting another entry in the bucket chain;

accessing the object handle table using the reference in the selected entry to access a field containing the memory address of the requested object; and returning the memory address of the requested object to the caller.

6. The method of claim 4 wherein the step of returning the memory address includes the step of storing the memory address into the identified field in the object handle table for the requested object.

7. The method of claim 4 wherein the requested object contains a network-wide object identifier of a referenced object, and wherein the step of loading the requested object includes:

allocating a field in the object handle table for the referenced object; and overwriting the network-wide identifier of the referenced object with a reference to the allocated field.

8. The method of claim 4 wherein the step of accessing the requested object includes:

prefetching a predefined number of functionally-related objects;

allocating fields in the object handle table for the predefined number of objects; and allocating entries in the bucket chains of the hash table for the predefined number of objects.

9. The method of claim 1 wherein the network-wide object identifier has an origin part such that functionally-related objects have equivalent origin parts, and wherein the step of converting the network-wide object identifier to a system-wide object identifier includes assigning a sequential number to the origin part of the network-wide object identifier.

10. The method of claim 9 wherein the computer system maintains a mapping table that maps sequential numbers to each origin part of the network-wide object identifiers for the objects in the memory of the computer system and wherein the step of converting the network-wide object identifier to a system-wide object identifier includes matching the origin part of the network-wide object identifier to a matching origin part in the mapping table, and setting the origin part of the system-wide object identifier equivalent to the sequential number mapped to the matching origin part.

11. The method of claim 1 wherein the hash function is designed to map more than one system-wide unique identifier into a single index to facilitate storage of entries for functionally-related objects into a same chain of buckets.

12. The method of claim 11 wherein the hash function is further designed to facilitate storage of entries for temporally-related objects in the same chain of buckets.

13. The method of claim 1 wherein the computer system has a cache having cache lines with each cache line having a cache line size, wherein each bucket of each chain of the hash table has a size equivalent to the cache line size, and wherein the step of accessing the bucket chain includes accessing the buckets of the bucket chain, wherein each accessed bucket is loaded into one of the cache lines with an exact fit.

14. The method of claim 1 wherein the object handle table entries contain a group of fields containing memory addresses of functionally-related objects, wherein the computer system has a cache having cache lines with a cache line size, wherein each entry has a size equivalent to the cache line size, and wherein the step of accessing the object handle table includes accessing an entry wherein the accessed entry is loaded into one of the cache lines with an exact fit.

15. A method in a computer system for storing data into a hash table having buckets, the computer system having objects with each object having associated data and having an identifier, a portion of the identifier being equivalent for functionally-related objects, comprising the steps of:

selecting a hash function that generates an index referring to a bucket in the hash table such that the hash function generates a same index for functionally-related objects; and utilizing the hash function to insert the associated data into the hash table wherein the associated data for functionally-related objects is stored in a same bucket.

16. A method in a computer system for storing data into a hash table having buckets, the computer system having objects with each object having associated data, comprising the steps of:

grouping the objects into groups, wherein each group contains functionally-related objects; and storing the associated data for each group into the hash table such that the associated data for functionally-related objects of each group is stored into a same bucket.

17. The method of claim 16 wherein the step of grouping the objects includes assigning an identifier to the objects such that a portion of the identifier is equivalent for each functionally-related object in a group and grouping the objects based on the portion of the identifier.

18. The method of claim 16, further including the step of:

selecting a hash function that causes collisions by generating an index into the buckets such that the functionally-related objects of the groups have equivalent indexes generated and wherein the step of storing the associated data from each group includes:

for each object,
invoking the hash function to generate an index referring to an indicated bucket; and
storing the associated data for the object into the indicated bucket.

19. The method of claim 16 wherein the computer system has a cache with cache lines having a cache line size, and wherein the buckets are the cache line size.

20. The method of claim 16 wherein each bucket is a chain of subbuckets.

21. The method of claim 20 wherein each subbucket contains associated data for a plurality of objects and wherein each subbucket contains an identifier for each of the plurality of objects.

22. The method of claim 20 wherein each object in the computer system has a corresponding object identifier, wherein each subbucket contains associated data for a plurality of objects, and wherein each subbucket contains a derivative of the object identifier for each of the plurality of objects.

23. A method for utilizing an object handle table having entries containing a predetermined number of memory addresses for objects stored in a memory of a computer system having a processor with a cache having cache lines with a cache line size, each object handle table entry being the cache line size, comprising the steps of:

storing memory addresses for the predetermined number of objects into a single entry in the object handle table; and accessing one of the entries to obtain a memory address whereupon the entry is loaded into one of the cache lines with an exact fit.

24. The method of claim 23 wherein the step of storing memory addresses includes grouping the objects into groups, wherein the objects in each group are functionally related, and storing the memory addresses for the predetermined number of functionally-related objects into the single entry.

25. The method of claim 24 wherein the step of grouping the objects includes assigning an identifier to the objects such that a portion of the identifier is equivalent for each group of functionally-related objects and grouping the objects based on the portion of the identifier.

26. The method of claim 25 wherein the step of storing memory addresses includes storing a single copy of the portion of the identifier into the single entry.

27. A computer system comprising:

a cache with cache lines having a cache line size;

a memory containing objects, an object handle table having entries containing a plurality of memory addresses for the objects, and an object loader for obtaining the memory addresses of the objects by accessing the object handle table; and a processor for running the object loader to obtain a memory address for a requested object and for loading the entry containing the memory address for the requested object into one of the cache lines with an exact fit.

28. A computer system connected to remote computers via a network, the computer system comprising:

a memory containing:
   a plurality of objects located at memory addresses;
   a mapping table that maps network-wide object identifiers to system-wide object identifiers;
   an object handle table with fields storing the memory addresses of the objects;
   a hash table with buckets containing entries for each object in the memory, each entry containing a reference to the field in the object handle table containing the memory address for the object; and
   an object loader that receives a network-wide object identifier of a requested object, converts the network-wide object identifier into a system-wide object identifier by utilizing the mapping table, inputs the system-wide object identifier to a hash function to generate an index referring to one of the buckets, accesses the referenced bucket to locate the entry for the requested object, accesses the located entry to obtain a reference to a field in the object handle table for the requested object, accesses the referenced field in the object handle table to obtain the memory address for the requested object, and returns the memory address of the requested object; and
a processor for running the object loader.

29. The computer system of claim 28, further including a cache having a cache line with a cache line size, wherein the buckets of the hash table are the cache line size.

30. The computer system of claim 29 wherein the cache is part of the processor.

31. The computer system of claim 28, further including a cache having cache lines with a cache line size, wherein the object handle table has entries containing a predetermined number of fields, and wherein the entries in the object handle table are the cache line size.

32. The computer system of claim 31 wherein the cache is part of the processor.

33. The computer system of claim 28 wherein each bucket contains entries for objects that are functionally related.

34. The computer system of claim 28 wherein each bucket contains entries for objects that are temporally related.

35. The computer system of claim 28 wherein the object handle table has entries with each entry containing a predetermined number of fields with memory addresses for objects that are functionally related.

36. A method for accessing objects located at memory addresses in a memory of a computer system having a hash table with a plurality of buckets each having entries containing an object identifier for an object and a reference to a field in an object handle table for the object, the field in the object handle table containing a memory address of the object, comprising the steps of:

receiving an identifier of a requested object for which a memory address is requested;
inputting the identifier into a hash function to generate an index referring to one of the buckets in the hash table;
accessing the bucket using the index;
searching the bucket for the entry of the requested object by matching the identifier in each entry against the identifier of the requested object;
accessing the entry of the requested object to obtain a reference to a field in the object handle table for the requested object;
accessing the field in the object handle table containing the memory address of the requested object using the reference; and
returning the memory address of the requested object.

37. A method for accessing objects located at memory addresses in a memory of a computer system connected to remote computer systems via a network, the computer system having a hash table with a plurality of buckets each having entries containing an object identifier for an object and sufficient information to obtain the memory address for the object, comprising the steps of:

receiving a request from a caller for a memory address of a requested object, the request containing a network-wide unique identifier of the requested object;
compressing the network-wide unique identifier into a system-wide unique identifier;
inputting the system-wide unique identifier into a hash function to generate an index referring to one of the buckets in the hash table;
accessing the bucket using the index;
searching the bucket for the entry of the requested object by matching the object identifier in each entry against the system-wide unique identifier;
accessing the entry of the requested object to access the sufficient information to obtain the memory address of the requested object; and
returning the memory address of the requested object to the caller by using the sufficient information.

38. A computer-readable medium containing instructions for controlling a computer system to access objects located at memory addresses in a memory, the computer system connected to remote computer systems via a network, the computer system having a hash table with a plurality of chains of buckets, each bucket having entries containing an identifier for an object and a reference to a field in an object handle table for the object, the field in the object handle table containing a memory address of the object, by performing the steps of:

receiving a request from a caller for a memory address of a requested object, the request containing a network-wide object identifier of the requested object;
converting the network-wide object identifier into a system-wide object identifier;
inputting the system-wide object identifier into a hash function to generate an index referring to one of the chains of buckets in the hash table;
accessing the bucket chain using the index;
searching the bucket chain for the entry of the requested object by matching the identifier in each entry against the system-wide object identifier of the requested object;
accessing the entry of the requested object to obtain a reference into the object handle table;
accessing the object handle table using the reference to identify the field containing the memory address of the requested object; and
returning the memory address of the requested object contained in the identified field to the caller.

39. A computer-readable medium containing instructions for controlling a computer system to store data into a hash table having buckets, the computer system having objects with each object having associated data and having an identifier, a portion of the identifier being equivalent for functionally-related objects, by performing the steps of:

selecting a hash function that generates an index referring to a bucket in the hash table such that the hash function generates a same index for functionally-related objects; and utilizing the hash function to insert the associated data into the hash table wherein the associated data for functionally-related objects is stored in a same bucket.

40. A computer-readable medium containing instructions for controlling a computer system to store data into a hash table having buckets, the computer system having objects with each object having associated data, by performing the steps of:

grouping the objects into groups, wherein each group contains functionally-related objects; and storing the associated data for each group into the hash table such that the associated data for functionally-related objects of each group is stored into a same bucket.

41. The computer-readable medium of claim 40 wherein the step of grouping the objects includes assigning an identifier to the objects such that a portion of the identifier is equivalent for each functionally-related object in a group and grouping the objects based on the portion of the identifier.

42. The computer-readable medium of claim 40, further including the step of:

selecting a hash function that causes collisions by generating an index into the buckets such that the functionally-related objects of the groups have equivalent indexes generated and wherein the step of storing the associated data from each group includes:

for each object,
invoking the hash function to generate an index referring to an indicated bucket; and
storing the associated data for the object into the indicated bucket.

43. The computer-readable medium of claim 40 wherein the computer system has a cache with cache lines having a cache line size, and wherein the buckets are the cache line size.

44. The computer-readable medium of claim 40 wherein each bucket is a chain of subbuckets.

45. The computer-readable medium of claim 44 wherein each subbucket contains associated data for a plurality of objects and wherein each subbucket contains an identifier for each of the plurality of objects.

46. The computer-readable medium of claim 44 wherein each object in the computer system has a corresponding object identifier, wherein each subbucket contains associated data for a plurality of objects, and wherein each subbucket contains a derivative of the object identifier for each of the plurality of objects.

47. A computer-readable medium containing instructions for controlling a computer system to utilize an object handle table having entries containing a predetermined number of memory addresses for objects stored in a memory, the computer system having a processor with a cache having cache lines with a cache line size, each object handle table entry being the cache line size, by performing the steps of:

storing memory addresses for the predetermined number of objects into a single entry in the object handle table; and accessing one of the entries to obtain a memory address whereupon the entry is loaded into one of the cache lines with an exact fit.

48. The computer-readable medium of claim 47 wherein the step of storing memory addresses includes grouping the objects into groups, wherein the objects in each group are functionally related, and storing the memory addresses for the predetermined number of functionally-related objects into the single entry.

49. The computer-readable medium of claim 48 wherein the step of grouping the objects includes assigning an identifier to the objects such that a portion of the identifier is equivalent for each group of functionally-related objects and grouping the objects based on the portion of the identifier.

50. The computer-readable medium of claim 49 wherein the step of storing memory addresses includes storing a single copy of the portion of the identifier into the single entry.

51. A computer-readable medium containing instructions for controlling a computer system to access objects located at memory addresses in a memory, the computer system having a hash table with a plurality of buckets each having entries containing an object identifier for an object and a reference to a field in an object handle table for the object, the field in the object handle table containing a memory address of the object, by performing the steps of:

receiving an identifier of a requested object for which a memory address is requested;

inputting the identifier into a hash function to generate an index referring to one of the buckets in the hash table;

accessing the bucket using the index;

searching the bucket for the entry of the requested object by matching the identifier in each entry against the identifier of the requested object;

accessing the entry of the requested object to obtain a reference to a field in the object handle table for the requested object;

accessing the field in the object handle table containing the memory address of the requested object using the reference; and returning the memory address of the requested object.

52. A computer-readable medium containing instructions for controlling a computer system to access objects located at memory addresses in a memory, the computer system connected to remote computer systems via a network, the computer system having a hash table with a plurality of buckets each having entries containing an object identifier for an object and sufficient information to obtain the memory address for the object, by performing the steps of:

receiving a request from a caller for a memory address of a requested object, the request containing a network-wide unique identifier of the requested object;

compressing the network-wide unique identifier into a system-wide unique identifier;

inputting the system-wide unique identifier into a hash function to generate an index referring to one of the buckets in the hash table;

accessing the bucket using the index;

searching the bucket for the entry of the requested object by matching the object identifier in each entry against the system-wide unique identifier;

accessing the entry of the requested object to access the sufficient information to obtain the memory address of the requested object; and returning the memory address of the requested object to the caller by using the sufficient information.

* * * * *